United States Patent [19]

Auer et al.

[11] Patent Number: 4,754,306

[45] Date of Patent: Jun. 28, 1988

[54] MICROFILM READING AND REVERSE ENLARGING APPARATUS

[75] Inventors: Josef Auer, Achstetten; Hubert Hackenberg, Holzkirchen; Adolf Koopmann, Egling; Jürgen Sylla, Sauerlach-Arget, all of Fed. Rep. of Germany

[73] Assignee: AGFA-Gevaert AG, Leverkusen, Fed. Rep. of Germany

[21] Appl. No.: 65,605

[22] Filed: Jun. 22, 1987

[30] Foreign Application Priority Data

Jul. 1, 1986 [DE] Fed. Rep. of Germany ....... 3622008

[51] Int. Cl.⁴ ............................................. G03B 13/28
[52] U.S. Cl. ........................................ 355/45; 355/5; 355/49
[58] Field of Search ...................... 355/45, 8, 51, 49, 5

[56] References Cited

U.S. PATENT DOCUMENTS

| | | | |
|---|---|---|---|
| 4,593,990 | 6/1986 | Auer et al. | 355/45 |
| 4,648,707 | 3/1987 | Tanasescu | 355/45 |
| 4,666,284 | 5/1987 | Yamada | 355/45 X |
| 4,708,463 | 11/1987 | Kondoh et al. | 355/45 |

FOREIGN PATENT DOCUMENTS 3415533 10/1985 Fed. Rep. of Germany .

*Primary Examiner*—Richard A. Wintercorn
*Attorney, Agent, or Firm*—Michael J. Striker

[57] ABSTRACT

A microfilm reading and reverse enlarging apparatus with a copying beam for a gap illumination comprises a copy carrier movable with a constant speed, drive device for moving the copy carrier, a film platform for a film and adjustable relative to an illuminating beam, transporting device for reciprocating the film platform synchronously with the movement of the copy carrier, control device for controlling the transporting device, a potentiometer adjustable by the transporting device synchronously with the movement of the platform so as to produce respective values in response to the movement of the platform during a copying process of successive microimages, and storing and comparing device arranged to store preselected values and to receive the values of the potentiometer to compare them with the preselected values, the storing and comparing device being connected with the control device so that the transporting device and the drive device for the copy carrier during reaching by the values of the potentiometer the preselected values are turned on and/or turned off.

11 Claims, 2 Drawing Sheets

MICROFILM READING AND REVERSE ENLARGING APPARATUS

BACKGROUND OF THE INVENTION

The present invention relates to a microfilm reading and reverse enlarging apparatus.

More particularly, it relates to the apparatus of the above mentioned type which utilizes a gap illumination provided by a copying beam and has an electrophotographic copying drum rotatable with a constant speed and/or copying sheets movable with a constant speed, a microfilm or microfiche platform adjustable relative to the illuminating beam and an enlarging objective, a switchable mirror system for selectively switching the reproducing beam produced by the enlarging objective from an image screen onto the copying drum and/or the copying sheets, a control device, and a transporting device for reciprocating the platform in one direction synchronously with the movement of the copying drum and/or copying sheets.

Apparatuses of the above mentioned general type are known in the art, for example from the German document DE-OS No. 3,415,533. The platform in this apparatus is moved in direction Y of the microfilm length or in direction Y of an image gap of a microfiche over a length of an individual image as considered in this direction. However, in these apparatuses it is not possible to provide automatically proceeding reverse enlargement of a row of microimages which follow one another in the direction Y of the automatic platform movement.

SUMMARY OF THE INVENTION

Accordingly, it is an object of the present invention to provide an apparatus of the above mentioned type which avoids the disadvantages of the prior art.

More particularly, it is an object of the present invention to provide an apparatus of the above mentioned type which can perform continuous automatic reverse enlargement of a number of successively arranged microimages in accordance which a respective preselection.

In keeping with these objects and with others which will become apparent hereinafter, one feature of the present invention resides, briefly stated, in that a microfilm reading and return enlarging device of the above type is provided, which comprises a potentiometer adjustable by the transporting means synchronously with the movement of the platform so as to produce respective values in response to the movement of the platform during a copying process of successive microimages; and storing and comparing means arranged to store preselected values and to receive the values of the potentiometer to compare them with the preselected values, the storing and comparing means being connected with the control means so that the transporting means and the drive means for the copy carrier during reaching by the values of the potentiometer the preselected values are turned on and/or turned off.

By the provision of the potentiometer which is adjustable synchronously to the movement of the platform, each position of the platform in the direction Y in which it is moved during copying is associated with an electric value which is comparable with a respective preselected electric value corresponding to the desired sequence of the reverse enlarging microimages or compared in a computer, so that thereby the turning off of the apparatus after the respective image sequence is performed automatically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
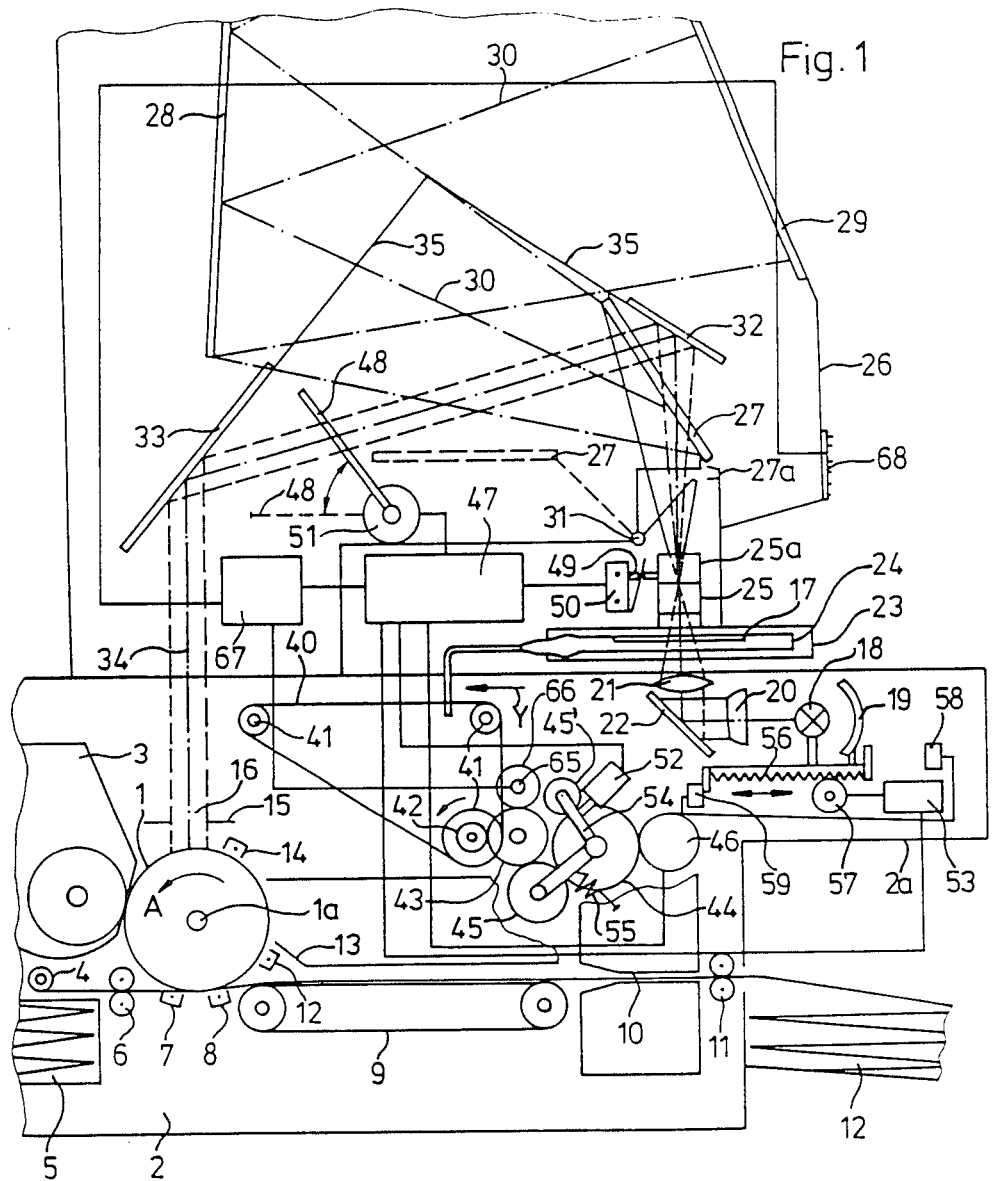
FIG. 1 is a schematic view of a microfilm reading and reverse enlarging apparatus in accordance with the present invention.

In a microfilm reading and reverse enlarging apparatus, a copying unit is arranged in a lower housing part 2 as can be seen from FIG. 1. The copying unit includes a photosensible copying drum 1 with conventional treatment stations of an electrographic copying device arranged on the drum. The charge image illuminated on the copying drum is developed in a developing device 3. By means of a roller abutment 4, individual sheets of a sheet stack or sheets of a leporello-shaped folded sheet stack 5 are transported in accordance with a copying cycle via a drawing roller pair 6 to the periphery of the copying drum 1. In the region of a transmission corotron 7, the charge image colored by toner in the developing device 3 is transferred onto the sheet. A removing corotron 8 facilitates the removal of the sheet which carries the powder image of the copy from the copying drum 1. From there, the copy carrier is transported via a transporting band, back to a fixing device 10, in which the powder image is melted on the copy carrier. From there, the copy carrier is transported via a discharge roller pair 11 to be stored in a storing compartment 12. Behind the removing corotron 8, as considered in the direction of rotation A of the copying drum 1, a cleaning corotron 12 is provided on the periphery of the copying drum and after this a cleaning device 13 for cleaning the drum surface from remaining toner is arranged. After the cleaning device 13, a charging corotron 14 is located for providing the copying drum simultaneously with electrical charge. A field diaphragm 15 defines a gap-shaped illuminating region 16 extending parallel to the axis of the copying drum.

A desk-like housing part 2a of the housing 2, which faces toward a user of the apparatus, accommodates an illuminating device for a microimage of a microfiche 17 to be projected. The illuminating device includes a lamp 18, a reflector 19, condensor lenses 20 and 21, and a deviating mirror 22. On the upper side of the desk-like housing part 2a, a support 23 for a microfiche platform 24 is provided. A microfiche 17 is insertable into the microfiche platform and displaceably supported in a known matter in two coordinate directions X and Y. Instead of the microfiche platform, also a microroll film platform can be provided, in which the roll film is can move in Y direction. An objective 25 is arranged above the platform 23, 24, preferably floatingly in a known manner. In some cases it is provided with a rotary prism 25a arranged on the objective 25 for image turning. The objective 25 projects the microimage via the deviating mirror 27, 28 arranged in the interior of an upper housing part 26, onto an image wall 29 which faces toward the user. An amplified image of the microimage is produced on the image wall 29. The course of the projection rays for observation of the microimage is shown in a dash-dot line identified with reference numeral 30.

The deviating mirror 27 is supported turnably about the axis 31 between two end positions shown in solid lines and in broken lines in FIG. 1. In its position shown in broken lines the mirror 27 is turned away from the path of rays, so that the image-reproducing path of rays acts upon the mirror 32 and the path of rays is deflected by the deflecting mirror 33 onto the copying drum 1. The course of the copying path of rays is identified by the dash-dot line 34. The mirrors 32 and 33 are arranged on an angular mirror support 35 at a right angle relative to one another.

The film platform 24 is connected with an end pulling rope 40 which is driveable via rope rollers 41 and gears 42, 43, 44, as well as coupling gears 45 or 45' arranged between them, from an electric motor 46. The electric motor 46 is connected with the control circuit 47. The platform 24 is displaced in direction Y by means of the pulling rope 40 and the motor 46 during the copying process, for strip-like scanning of a microimage synchronously with movement of the copying drum 1. When a microimage with different enlargement must be copied, the objective 25 can be formed as an exchange objective. One exchange objective 25 can have for example a conventional 24-time enlargement, while another exchange objective 24 with 12-time enlargement can also be provided. The exchange frame for the objective can be formed in a known manner.

Figure 2:
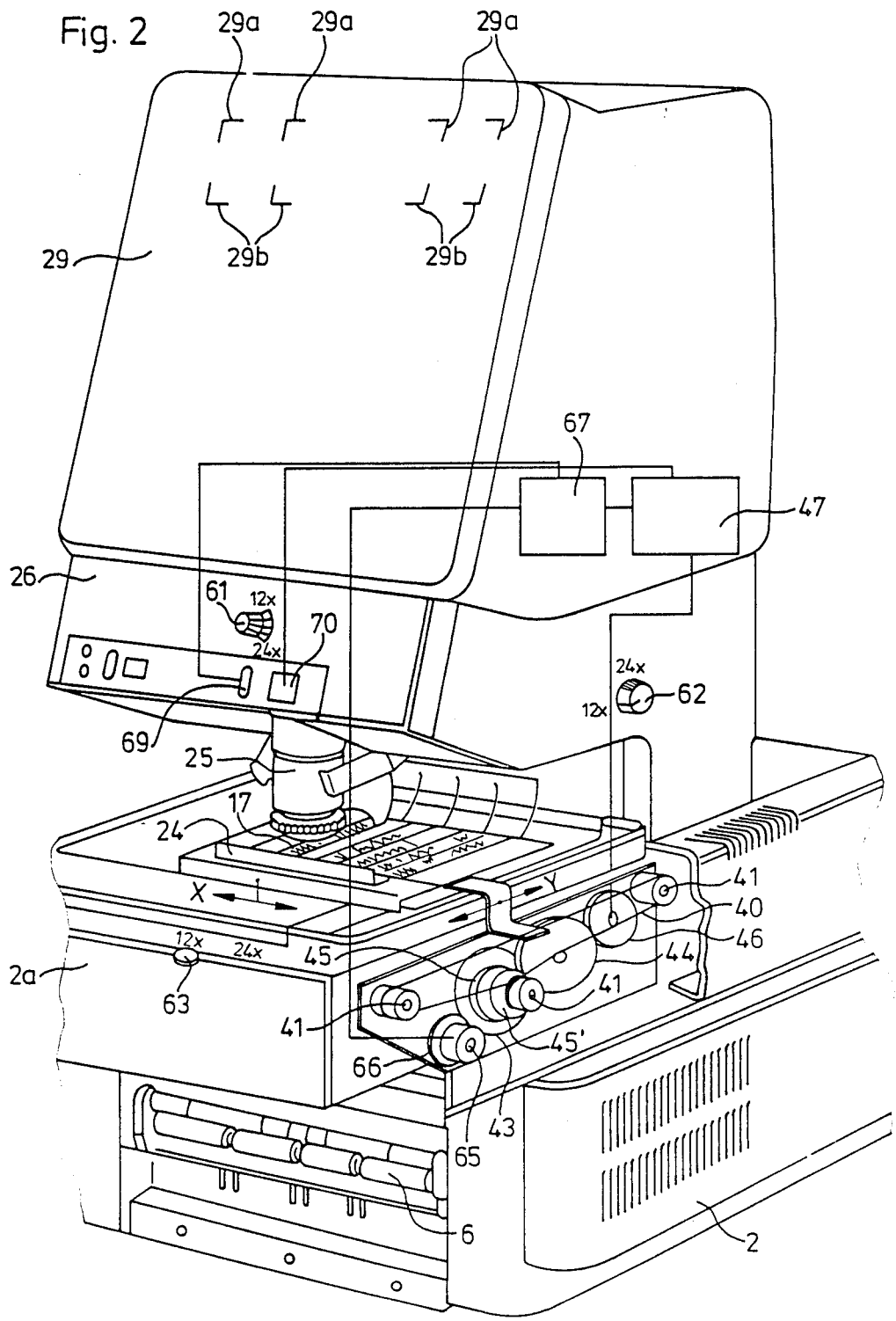
FIG. 2 is a schematic view of the inventive apparatus in accordance with a different embodiment of the present invention.

When an exchange objective is used in the reading and reverse enlarging apparatus, this has the result for the copying part 2 that because of the constant drum speed during the use of the objective with the smaller enlargement, the platform 24 must be moved slower by means of the pulling rope 40. Moreover, the illuminating device 18–19 must be arranged closer to the platform 24 than in the event of the use of the objective with the greater enlargement. Finally, during the use of the objective with the smaller enlargement, a copying mask 28 must be turned into the copying path of rays. For this purpose three adjusting handles 61, 62 and 63 are provided in the apparatus, as shown in FIG. 2.

For eliminating the necessity of manual adjustment during the objective exchange, the objective frame of the objective 25 with the smaller enlargement in FIG. 1 has a control pin 49 which acts in the inserted position of the objective 25 upon a double switch 50 and reverses the polarity of a circuit which forms a part of the control circuit 47. Thereby a rotary magnet 51 for the copying mask 48, lifting magnet 52, and an electric motor 53 are turned on for operation in a predetermined direction. The rotary magnet 51 turns the copying mask 48 to the copying path of rays. The lifting magnet 52 pulls the smaller coupling gear 45' on an angular lever 54 against the action of a spring 55 out of engagement with the gears 43 and 44, and thereby turns the greater coupling gear 45 so that the movement of the platform 24 becomes respectively slower. The magnets 51 and 52 remain energized as long as the objective 25 with the control pin 49 are inserted in the apparatus.

The lamp 18 and the mirror 19 are supported on a toothed rack 56 or connected with one of pulling ropes similar to the rack and driven through the motor 53 for example via a gear 57. During insertion of the objective 25 with the control pin 49, the motor 53 is turned on in operation via a switch 59 so that the toothed rack 56 with the lamp 18 and the mirror 19 is displaced toward the condensor lens 20, till the switch 59 changes its polarity by the toothed rack 56 and the motor 53 is turned off. Thereby, because of the switch 50 and the control pin 49, all parts for the enlargement of the objectives 25, 49 are adjusted without additional manual handling during the objective exchange.

If in contrast, the objective inserted in FIG. 1 with the smaller enlargement is replaced by an objective with a greater enlargement which has no control pin 49, the double switch 50 is returned to its different position under the action of the spring and changes the polarity. Thereby the copying mask 48 is turned by the rotary magnets 52 from the copying path of rays into the position indicated by a broken line. The lifting magnet 52 deenergizes, so that the gear 54' is pulled in engagement with the gears 43, 44 by means of the spring 55. Moreover, the motor 53 is controlled in an opposite way and displaces the toothed rack 56 together with the lamp 18 and the mirror 19 to another position until the toothed rack 56 reaches the abutment against the switch 58 and turns the latter off or changes its polarity.

In the embodiment shown in FIG. 2, the adjustments required in FIG. 1 are performed manually via the handles 61, 62, 63, whereas the coupling gears 65 and 65' for changing the transmission are displaceable axially.

The specific feature of the inventive apparatus shown in FIGS. 1 and 2 is that not only a microimage is always copied and then the next microimage to be copied must be inserted manually by means of displacement of the platform 24 to the objective 25, but it is possible to perform a continuous copying process for several microimages which are to be selected and are arranged one after the other in Y direction.

For this purpose a potentiometer 65 is arranged in the transporting transmission for the film platform 24 between the coupling 45, 45' and the pulling rope 40. The potentiometer 65 is for example, driveable by means of a transmission gear 43 via a gear 66 connected with the potentiometer 65, synchronously with the movement of the platform 24 in Y direction so as to be adjustable changeably in its value. The potentiometer 65 is connected with an electronic storage and comparison device 67, so that its actual value is continuously introduced into it and compared with predetermined or preselected comparison values which correspond to a preselected sequence of microimages in the image platform 24 in Y direction. The storage and comparison device 67 is connected with the control device 47. A predetermined voltage or resistance value on the potentiometer 65 corresponds to each position of the platform 24 and particularly both to the gap-type reproduction of an individual microimage on the copying drum 1 or on a copying sheet synchronously movable therewith, as well as to progressive gap-type copying of several microimages in Y direction.

When an image of a microroll film passing in Y direction or a microimage gap of a microfiche 17 passing in Y direction is associated with the objective 25, this position corresponds to a predetermined value on the potentiometer 65. When starting from this individual image, three or four or more microimages are additionally copied in one pull, the storing and comparing device 67 must be supplied with the associated initial value of the potentiometer 67 and the number of the images to be copied, and the corresponding potentiometer end value required for the respective platform path in Y direction. During the copying process and thereby the movement of the platform 24, other actual values of the potentiometer 65 are compared in the storing and comparing device 67 with the above selected initial and end values. Starting from the initial value in the beginning of the copying process, the comparison between the actual potentiometer value and the preselected end value, a signal on the control device 47 is provided for switching off of the platform drive and the copying part, or in other words the drum 1 and/or the copying sheet transportation.

The following modes of operation are possible in the inventive apparatus:

When each individual microimage to be copied is selected on the image screen 29, the platform 24 must be moved back every time during the selection of the image so that the whole microimage to be copied is reproduced in a gap-like manner from above downwardly on the copying drum 1. For this purpose one or several marks 29a, depending on the format of the image, must be provided on the image screen 29 for adjusting one corner of the microimage to be copied. This mark or marks 29a are associated with the position of the platform 24 so that the platform movement in Y direction and thereby the copying process starts with the upper or lower edge of the microimage. When in contrast a sequence of images must be copied, then again a corner of the first microimage to be copied must be adjusted with respect to mark 29a on the image screen 29, and then the respective potentiometer initial value is supplied to the storing and comparing device 67 as will be explained hereinbelow. Then the potentiometer value is supplied to the storing and comparing device 67, as again will be explained hereinbelow, in correspondence with the side end of the last image to be copied. Then, either starting from the side periphery of the first selected image or its adjustment to a mark 29a on the image screen 29 in direction to the last selected image, or starting from the side end of the last image selected on the image screen 29 and its adjustment to a mark 29b on the image screen, the copying process is performed in direction to the beginning of the first selected image and automatically ended upon reaching of the pre-given potentiometer end value or initial value, by the actual value on the potentiometer 65. When images of microfiche with image rows must be copied in X direction, then always first the adjustment of the image gap to be copied in X direction on the image screen must be performed. Then the images to be copied of the respective image gaps adjusted in X direction and extending in Y direction can be preselected and automatically copied in the above described manner.

In the embodiment shown in FIG. 1 the selection of the image sequence to be copied and thereby the supply of the respective initial and end values to the storing and comparing device is performed by means of a schematically shown selection keyboard 68 which is connected with the storing and comparing device 67. The first image to be copied is adjusted with its upper edge to the respective image screen mark 29a. The associated potentiometer value is stored, for example by means of a storing key in the storing and comparing device 67. Then, by means of the keyboard 68, the number of the microimages to be copied, from first adjusted image, is supplied. This number is converted in the storing and comparing device 67 into an image sequence to be copied or into the respective platform movement or into the respective differential value corresponding to the required change of the value on the potentiometer 65, and then stored. During the subsequent release of the copying process, this takes place until the actual potentiometer value reaches the supplied differential value. An individual sheet is pulled into the copying part in correspondence with the microimage to be copied. When the sheet stack is folded in a leporello-like manner, the advantages obtained in that the whole preselected image sequence to be copied are copied on the assembled sheets, so that the maintenance of the copy sequence is guaranteed as long as the sheets are not separated from one another by hand.

In accordance with the embodiment of FIG. 2, the storing of the voltage or resistance values in the storing and comparing device 67 in correspondence with the platform positions at the beginning and at the end of the image sequence to be copied is performed by adjustment of the beginning of the first image to one of the marks 29a on the image screen 29 and actuation of a storing key 69 connected with the storing and comparing device 67. Then the platform 24 is displaced in Y direction by hand, until the end of the last image to be copied is aligned with the associated mark 29b. The associated value of the potentiometer 65 is also stored similarly by actuation of the storing key 69 or a further storing key in the storing and comparing device 67. Then, a copying key 70 is actuated in one of the platform positions, depending on the design of the arrangement either from the beginning of the first image or from the end of the last image, so that the copying process starts and runs under synchronous movement of the platform 24, drum 1 and the copying paper, till after the final position of the preselected copying sequence by comparison between the potentiometer value and the stored end value in the storing and comparing device 67, it is turned off.

All known cross carriage designs or roll film platform designs can be used for the platform 24 and its support. Also all commercial transporting devices and transmission constructions can be used, for example, a gear drive instead of a pulling rope 40. For the storing and comparing device 67 and the control device 47, also all known electrical circuits can be used.

It will be understood that each of the elements described above, or two or more together, may also find a useful application in other types of constructions differing from the types described above.

While the invention has been illustrated and described as embodied in a microfilm reading and reverse enlarging apparatus with a transporting device for a microfilm platform, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A microfilm reading and reverse enlarging apparatus with a copying beam for a gap illumination, comprising a copy carrier movable with a constant speed;

drive means for moving said copy carrier; a film platform for a film and adjustable relative to an illuminating beam; transporting means for reciprocating said film platform synchronously with the movement of said copy carrier; control means for controlling said transporting means; a potentiometer adjustable by said transporting means synchronously with said movement of said platform so as to produce respective values in response to the movement of said platform during a copying process of successive microimages; and storing and comparing means arranged to store preselected values and to receive said values of said potentiometer to compare them with said preselected values, said storing and comparing means being connected with said control means so that said transporting means and said drive means for said copy carrier during reaching by said values of said potentiometer the preselected values are turned on and/or turned off.

2. The microfilm reading and reverse enlarging device as defined in claim 1, wherein said copy carrier is formed as an electrophotographic copying drum which is rotatable with a constant speed.

3. A microfilm reading and reverse enlarging device as defined in claim 1, wherein said copy carrier is formed by a plurality of copy sheets which are movable with a constant speed.

4. A microfilm reading and reverse enlarging device as defined in claim 1, wherein said film platform is formed as a microfilm platform arranged for supporting a microfilm.

5. A microfilm reading and reverse enlarging device as defined in claim 1, wherein said film platform is formed as a microfiche platform arranged to support a microfiche.

6. A microfilm reading and reverse enlarging device as defined in claim 1 and further comprising an image screen arranged to supply the illuminating beam onto said copy carrier; an enlargement objective through which said illuminating beam is supplied from said image screen to said copy carrier; and a variable mirror system for selective varying the illuminating beam produced from said enlarging objective.

7. A microfilm reading and reverse enlarging device as defined in claim 1; and further comprising an image selecting keyboard connected with said storing and comparing means and arranged for preselecting the values, starting from an initial position of said platform.

8. A microfilm reading and reverse enlarging apparatus as defined in claim 1 and further comprising means for programming before a copying process, so that the selection of the values by means of said potentiometer, starting from an initial position of said platform, is performed by the movement of said platform and thereby said potentiometer in accordance with a program provided by said programming means before the copying step.

9. A microfilm reading and reverse enlarging device as defined in claim 1 and further comprising at least two exchangeably enlargement objectives having different enlargement values, said transporting means being provided with a plurality of gears; a coupling for coupling respective ones of said gears of said transporting means for adjusting the speed of the movement of said platform to respective one of said enlarging objectives, a transmission branch arranged to drive said potentiometer from said gears of said transporting means, said transmission branch being arranged between said coupling and said platform.

10. A microfilm reading and reverse enlarging apparatus as defined in claim 9, wherein said transmission branch includes a gear connected with said gears of said transporting means.

11. A microfilm reading and reverse enlarging apparatus as defined in claim 1, wherein said copy carrier includes a plurality of copy sheets which are folded in a leporello-like manner to form an assembled sequence of copy sheets.

* * * * *